US008914518B2

(12) United States Patent
Doyle et al.

(10) Patent No.: US 8,914,518 B2
(45) Date of Patent: Dec. 16, 2014

(54) INTERMEDIARY FOR SATISFYING A SERVICE REQUIREMENT ESTABLISHED BY A SERVICE PROVIDER

(75) Inventors: Ronald Patrick Doyle, Raleigh, NC (US); David Louis Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1367 days.

(21) Appl. No.: 10/831,056

(22) Filed: Apr. 23, 2004

(65) Prior Publication Data

US 2005/0240422 A1 Oct. 27, 2005

(51) Int. Cl.
G06F 15/16 (2006.01)
G06F 9/50 (2006.01)
H04L 29/08 (2006.01)
G06F 21/33 (2013.01)

(52) U.S. Cl.
CPC .............. *H04L 67/16* (2013.01); *G06F 9/5027* (2013.01); *H04L 67/28* (2013.01); *G06F 9/5055* (2013.01); *H04L 67/2823* (2013.01); *G06F 21/335* (2013.01)
USPC ......................................................... 709/227

(58) Field of Classification Search
USPC ................................................. 709/227–229
See application file for complete search history.

(56) References Cited

U.S. PATENT DOCUMENTS

| 5,862,490 | A | * | 1/1999 | Sasuta et al. .................. 455/525 |
| 5,907,607 | A | * | 5/1999 | Waters et al. ............ 379/201.03 |
| 6,236,997 | B1 | | 5/2001 | Bodamer et al. |
| 6,338,088 | B1 | * | 1/2002 | Waters et al. ................. 709/226 |
| 6,345,289 | B1 | | 2/2002 | Lotspiech et al. |
| 6,351,771 | B1 | | 2/2002 | Craddock et al. |
| 6,529,950 | B1 | | 3/2003 | Lumelsky et al. |
| 6,549,768 | B1 | * | 4/2003 | Fraccaroli .................. 455/456.3 |
| 6,571,140 | B1 | * | 5/2003 | Wewalaarachchi et al. .... 700/83 |
| 6,904,449 | B1 | * | 6/2005 | Quinones ...................... 709/203 |
| 6,907,406 | B2 | * | 6/2005 | Suzuki ............................ 705/52 |
| 6,938,154 | B1 | * | 8/2005 | Berson et al. ................. 713/156 |
| 7,194,733 | B2 | * | 3/2007 | Ringseth et al. ............. 717/136 |
| 7,206,744 | B2 | * | 4/2007 | Suryanaraya .............. 704/270.1 |

(Continued)

FOREIGN PATENT DOCUMENTS

WO    PCT/WO00/67444    11/2000

OTHER PUBLICATIONS

Box, D. et al., Web Services Policy Framework (WS-Policy), Jun. 2, 2003, Version 1.01, pp. 1- 21.*

(Continued)

*Primary Examiner* — Alicia Baturay
(74) *Attorney, Agent, or Firm* — Marcia L. Doubet

(57) ABSTRACT

An intermediary or intermediaries are provided to allow a service requestor to communicate with a service provider according to a service requirement or service policy set forth by the service provider which the service requester is unable to meet directly. To this end, the service requestor determines whether it can communicate with the service provider according to the service requirement. If the service requestor is unable to satisfy the service requirement, but does have some property which is translatable, then the service requestor finds an intermediary that can translate the service requestor's property in order to satisfy the service provider's service requirement. Once the intermediary is found, the service requestor requests translation of its property to satisfy the service provider's service requirement. Thus, the service requestor receives service from the service provider while adhering to the service provider's service policy.

6 Claims, 6 Drawing Sheets

(56) References Cited

U.S. PATENT DOCUMENTS

| | | | |
|---|---|---|---|
| 7,254,601 B2 * | 8/2007 | Baller et al. | 709/200 |
| 7,280,822 B2 * | 10/2007 | Fraccaroli | 455/414.3 |
| 7,440,940 B2 * | 10/2008 | Chen et al. | 1/1 |
| 7,475,146 B2 * | 1/2009 | Bazot et al. | 709/227 |
| 7,610,045 B2 * | 10/2009 | Little et al. | 455/418 |
| 2002/0026535 A1 | 2/2002 | Srinivasan | |
| 2002/0052797 A1 | 5/2002 | Maritzen et al. | |
| 2002/0059133 A1 | 5/2002 | Entani | |
| 2002/0059429 A1 | 5/2002 | Carpenter et al. | |
| 2002/0062300 A1 | 5/2002 | Asadov et al. | |
| 2003/0065774 A1 | 4/2003 | Steiner et al. | |
| 2003/0074401 A1 * | 4/2003 | Connell et al. | 709/203 |
| 2003/0204612 A1 * | 10/2003 | Warren | 709/230 |
| 2003/0236700 A1 * | 12/2003 | Arning et al. | 705/11 |
| 2004/0030627 A1 * | 2/2004 | Sedukhin | 705/36 |
| 2004/0054690 A1 * | 3/2004 | Hillerbrand et al. | 707/104.1 |
| 2004/0110497 A1 * | 6/2004 | Little | 455/418 |
| 2004/0111699 A1 * | 6/2004 | Rockwell | 717/103 |
| 2004/0121789 A1 * | 6/2004 | Lindsey | 455/517 |
| 2004/0122926 A1 * | 6/2004 | Moore et al. | 709/223 |
| 2004/0128375 A1 * | 7/2004 | Rockwell | 709/223 |
| 2004/0172441 A1 * | 9/2004 | Beringer et al. | 709/200 |
| 2004/0225656 A1 * | 11/2004 | Sarkar | 707/9 |
| 2005/0021670 A1 * | 1/2005 | Maes | 709/217 |
| 2005/0044197 A1 * | 2/2005 | Lai | 709/223 |
| 2005/0065879 A1 * | 3/2005 | Birch et al. | 705/40 |
| 2005/0086297 A1 * | 4/2005 | Hinks | 709/203 |
| 2005/0091174 A1 * | 4/2005 | Akkiraju et al. | 705/75 |
| 2005/0096960 A1 * | 5/2005 | Plutowski et al. | 705/8 |
| 2005/0198304 A1 * | 9/2005 | Oliver et al. | 709/227 |
| 2005/0204139 A1 * | 9/2005 | Helland et al. | 713/171 |
| 2005/0228693 A1 * | 10/2005 | Webb et al. | 705/2 |
| 2005/0267952 A1 * | 12/2005 | Ricciardi et al. | 709/220 |
| 2006/0053296 A1 * | 3/2006 | Busboom et al. | 713/182 |
| 2006/0085412 A1 * | 4/2006 | Johnson et al. | 707/4 |
| 2007/0136236 A1 * | 6/2007 | Kussmaul et al. | 707/2 |
| 2009/0006152 A1 * | 1/2009 | Timmerman et al. | 705/7 |

OTHER PUBLICATIONS

Baïna, Karim et al., "A Model for Process Service Interaction", CoopIS/DOA ODBASE 2002, LNCS 2519, p. 524, 2002.

Decker, Keith et al., "Middle-Agents for the Internet", IJCAI-1997. Proceedings of the Fifteenth International Joint Conference on ArtificialIntelligence, vol. 1, pp. 578-583.

IBM, "Web Services Policy Framework", http://www-106,.ibm.com/developerworks/library/ws-polfram.

Web Services Architecture, http://www.w2.org/TR/2004/NOTE-ws-arch-20040211 , W3C Working Group Note 11, Feb. 2004.

IBM, "Service Recommendation System for the Web-Services Broker", No. 454121, Research Disclosure, Feb. 2002, pp. 286-289.

* cited by examiner

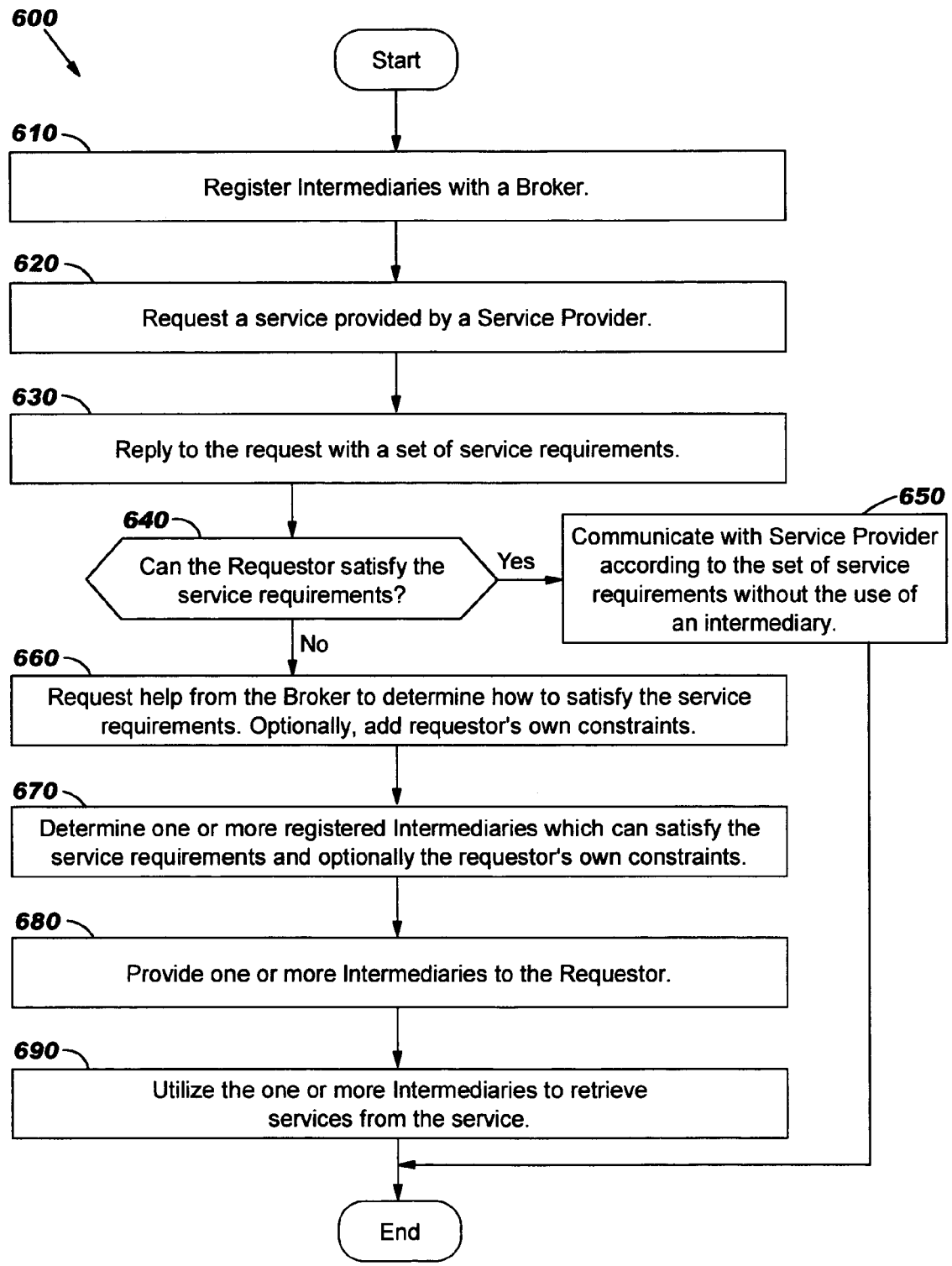

INTERMEDIARY FOR SATISFYING A SERVICE REQUIREMENT ESTABLISHED BY A SERVICE PROVIDER

FIELD OF THE INVENTION

The present invention generally relates to satisfying service policies announced by a web service, and more particularly, to providing a system, method and program product for a translation intermediary for satisfying service requirements.

BACKGROUND OF THE INVENTION

With the continual growth of the world wide web and the growing reliance of businesses on the world wide web for interacting with other businesses and with individuals, a services-oriented architecture has been utilized to help information technology (IT) groups integrate existing backend applications, for example, with new and other front end applications. Services-oriented architecture is a term describing an architecture supporting the provision of services which are performed by groups of software components that carry out business processes such as verifying a credit card transaction or processing a purchase order. At its most basic level, a services-oriented architecture defines a collection of services on a network such as the Internet that communicate with one another to accomplish a specific task. Typically, the services are loosely coupled, have well-defined platform-independent interfaces, and are re-usable.

Services-oriented architecture is an abstract concept which describes a higher level of software application development which focuses on business processes and standard interfaces to mask out the technical complexity of the underlying IT environment. Such a higher level abstraction allows services provided by different businesses to be utilized by an application developer. For example, services may include a time of day service which provides time based on the United States' atomic clock and a weather service which provides weather information for various regions of the United States. Services are well-defined, self-contained, and do not depend on the context or state of other services. The application developer may add time of day and weather services to his or her application without having to know the details of the underlying mechanisms for accumulating the information for providing that service. A basic service-oriented architecture includes a service requestor or consumer and a service provider. The service consumer typically sends a service request message over a network to a service provider and the service provider returns a response message to the service consumer. The service provider may also be a service consumer as well.

Examples of services-oriented architectures include Distributed Component Object Model (DCOM), Object Request Brokers (ORBs) based on the Common Object Request Broker Architecture (CORBA®) specification, web services, and the like. The term web service refers to a collection of technologies and specifications that support interoperable machine-to-machine interaction over a network. For example, a web service defines communication between the requestor and the server. It has an interface described in a machine-processable format such as Web Services Description Language (WSDL). Other systems interact with the Web service in a manner prescribed by its description using Simple Object Access Protocol (SOAP) messages, typically conveyed using hyper text transfer protocol (HTTP) using extensible markup language (XML) serialization in conjunction with other web-related standards. The Web Services Description Language (WSDL) provides grammar and syntax for a service provider to describe its service. The description may be published in a directory of services. A web services policy framework (WS-Policy), developed by a consortium of companies including IBM and Microsoft, provides extensible grammar for expressing the capabilities, requirements, and general characteristics of entities in a services based system. WS-Policy defines a framework and a model for the expression of these properties or service requirements as policies. For example, when a requestor requests service from a provider, the provider may require the requester to communicate with it over a specific authentication policy such as Kerberos. In another example, a service that provides streaming media, such as video, might require that the requestor be able to buffer a certain volume of data. In another example, a service might require a requestor to communicate over a network with a particular set of minimum latency and jitter characteristics. The WS-Policy specifies grammar and language which allows the provider to communicate these service requirements to the requestor over lower level protocols such as HTTP, transaction control protocol/internet protocol (TCP/IP), and the like.

A problem arises, however, when a requester determines it cannot fulfill the service requirements specified by the service provider. For example, the requestor may only know how to be authenticated by using the Public Key Infrastructure (PKI) instead of Kerberos. Typically, the requestor's only option is to find another service provider which offers the same service which has service requirements that the requestor may satisfy. Such a search may needlessly expend computer and network resources without ever finding a match of service requirements that the requestor can satisfy. Or, in some cases, where an alternate service is found, the alternate service may be less desirable, for example, due to its lower performance. For more information on finding service providers based on a requested service policy, please refer to U.S. Patent Application Publication 2004/0098606 entitled "SYSTEM, METHOD AND PROGRAM PRODUCT FOR OPERATING A GRID OF SERVICE PROVIDERS BASED ON A SERVICE POLICY" published May 20, 2004.

Some prior approaches attempt to alleviate the problem by providing service brokers in the network. In these approaches, service providers register with these service brokers. When a requester wants a service, these service brokers initially will attempt to find service providers which match the requirements of the requestor. Since the requirements of the requestor drive the service broker's search, in some cases, a service provider matching the requestor's requirements cannot be found. Or, in other cases, the match, while acceptable, is not optimal.

SUMMARY OF THE INVENTION

Among its several aspects, the present invention recognizes that a need exists for a technique to allow a requestor to receive service from a service provider even though the requestor cannot directly satisfy the service requirements of a service provider. Further, a need also exists for the requestor's own requirements to be satisfied when receiving service from a service provider.

The present invention provides a subsystem, method, and program product for satisfying a service requirement of a service provider on behalf of a service requester. Before the requestor receives a service from the service provider, the service provider sets forth a service requirement or service policy which the service requester must satisfy. The service requestor determines whether its own property can satisfy the service requirement. If the property cannot satisfy the service requirement, the service requestor requests an intermediary to translate the property. Once an intermediary is found, the service requester has the intermediary translate the property to satisfy the service requirement of the service provider. Thus, the service requestor receives service from the service provider while adhering to the service provider's service policy.

In utilizing the intermediary, the present invention advantageously provides a service requester with a system for satisfying the service requirement of the service provider when the service requestor cannot satisfy the service requirement by itself allowing the service requestor access to an otherwise inaccessible service provider. Further, by utilizing an intermediary, the service requestor may advantageously leverage different intermediaries providing similar translations and different service providers providing similar services by selecting a particular combination of intermediary and service provider to minimize cost, time, or other constraint of importance to the requestor.

According to one aspect of the present invention, a system for providing communication between a requestor and a service provider when the requestor cannot satisfy a service requirement of the service provider is provided. The service requestor is operable to communicate using a first property which is incompatible to directly satisfy the service requirement. The subsystem includes an input for receiving a message from the requestor containing the first property, a translation mechanism for translating the first property, and an output for sending a message containing the translated property thereby allowing communication between the requestor and service provider to satisfy the service requirement.

According to a further aspect of the present invention, a program product stored on a recordable medium for providing communication between a requestor and a service provider when the requestor cannot satisfy a service requirement of the service provider is provided. The requestor is operable to communicate using a first property which does not satisfy the service requirement. When executed, the program product includes program code for receiving a message from the requestor containing the first property, program code for translating the first property, and program code for sending a message containing the translated property allowing communication between the requester and service provider to satisfy the service requirement.

According to another aspect of the present invention, a method for using an intermediary for translating operations between a property of a service requestor to satisfy a service requirement of a service provider is provided. The method includes receiving a service requirement which controls the communication between the service requestor and service provider, determining that the service requirement cannot be satisfied by the service requester, determining an intermediary which provides a translation operation of the property to satisfy the service requirement, translating the property to satisfy the service requirement, and communicating between the service requestor and the service provider in accordance with the service requirement.

According to an additional aspect of the present invention, a computer readable medium whose contents cause a computer system to establish communication between a service requestor having a property and a service provider having a service requirement is provided. The service requestor is not operable to satisfy the service requirement. When executing the instructions of the computer readable medium, the computer system performs the steps of receiving a service requirement which controls the communication between the service requestor and service provider, determining that the service requirement cannot be satisfied by the service requestor, determining an intermediary which provides a translation operation of the property to satisfy the service requirement, translating the property to satisfy the service requirement, and communicating between the service requestor and the service provider in accordance with the service requirement.

A more complete understanding of the present invention, as well as further features and advantages of the invention, will be apparent from the following Detailed Description and the accompanying drawings.

BRIEF DESCRIPTION OF THE DRAWINGS

FIG. 6 shows a method of using an intermediary for translating operations between a service requestor and service provider in accordance with the present invention.

DETAILED DESCRIPTION

The description of the present invention now will be presented for purposes of illustration and description, and is not intended to be exhaustive or as limiting the invention in the form disclosed. Many modifications and variations will be apparent to those of ordinary skill in the art. The chosen embodiment is described in order to best explain the principles of the invention, their practical application, and to enable others of ordinary skill in the art to understand the invention. Subject to the limitations of the claims, various embodiments with various modifications as necessary to adapt the present invention to a particular environment or use are hereby contemplated, including without limitation the adaptation of various teachings herein in light of rapidly evolving hardware and software components and techniques.

Figure 1:
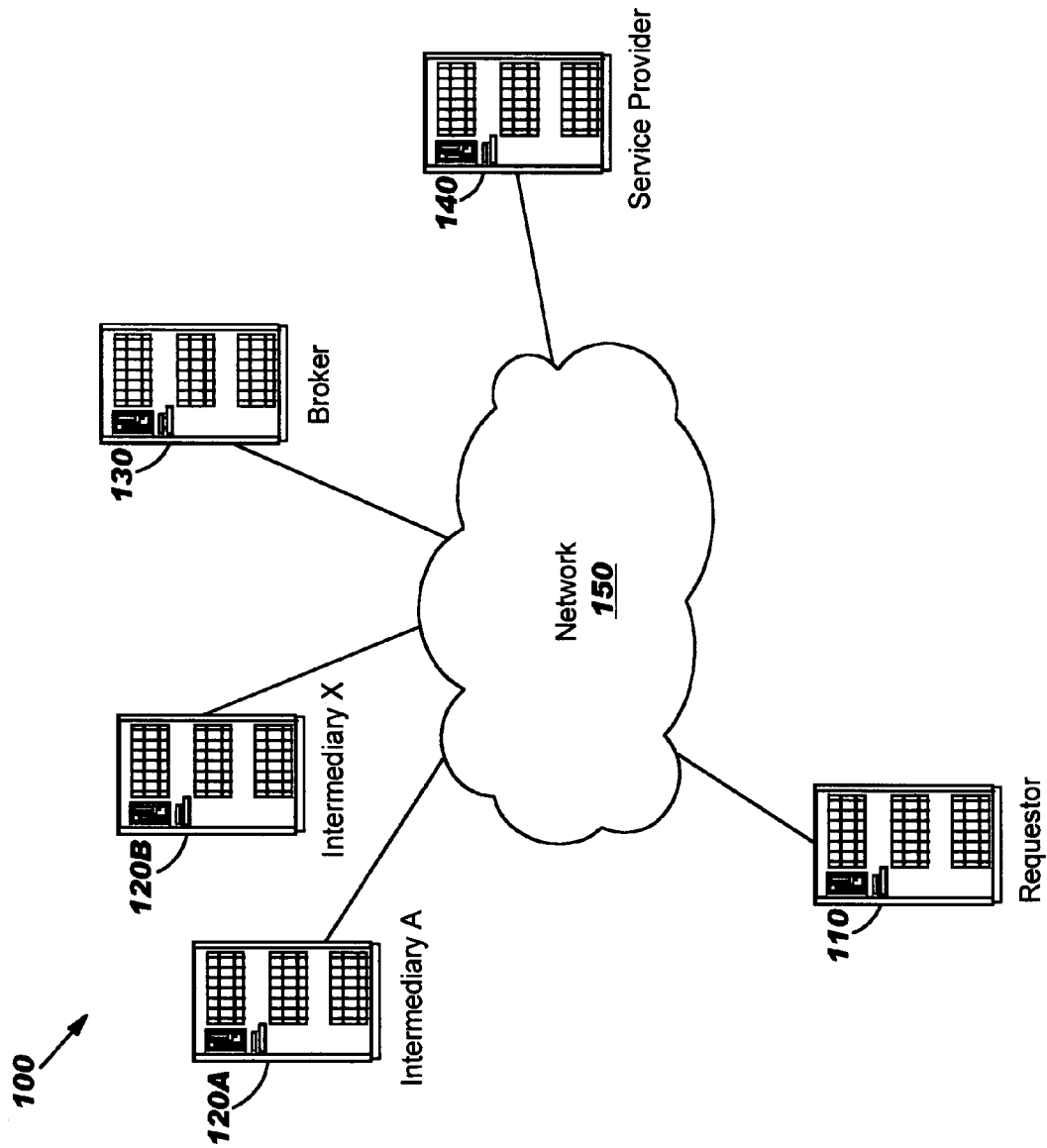
FIG. 1 shows an exemplary system in accordance with the present invention.

FIG. 1 shows an exemplary system 100 in accordance with the present invention. The system 100 includes various subsystems including a requestor 110, a service provider 140, a broker 130, and two intermediaries 120A and 120B communicating over a network 150. Although only one or two named subsystems are illustrated, it is noted that multiple subsystems may and typically will be provided. Each of the subsystems is represented as running on a computer and communicating over the network 150. The requestor's role is to receive a service from the service provider. For example, the service may include a weather service, time of day service, or the like. The requestor may be disposed within an application program which provides a total solution to a user (not shown). The user may access the application program using a web browser such as Netscape, Internet Explorer, or the like on another computer or the requestor machine itself. The service provider 140 provides the service only if its service requirements can be satisfied. Typically, these service requirements are specified using WS-Policy. At the behest of the requestor 110, the broker 130 is responsible for finding an intermediary to help the requester 110 to satisfy the service provider's service requirements. Optionally or alternatively, the requestor 110 may have its own constraints in finding a suitable intermediary. For example, the requestor may have a specific timing budget in which a suitable intermediary must operate. Where an intermediary charges for its translation or conversion function, the requestor may have a specific cost budget in which a suitable intermediary must operate.

The broker 130 is responsible for finding a suitable intermediary where the service requirements and requestor constraints, if any, are satisfied. Intermediaries 120A and 120B provide conversion or translation functions. Such functions allow a requestor having one property but requiring a conversion or translation of that property to communicate with the service provider according to the service provider's service requirements. For example, a service provider may require a requestor to be authenticated using the Kerberos authentication model. Meanwhile, the requestor may only support PKI. An intermediary, such as intermediary 120A, would then translate a PKI authentication mode to a Kerberos authentication mode. In this particular example, subsequent communication between the requestor 110 and the service provider 140 will exist through intermediary 120A so that intermediary 120A can preserve a PKI session with requestor 110 and a Kerberos session with the service provider 140. Message flows between these subsystems will be described in further detail below in connection with the discussion of FIGS. 3 and 4.

System 100 is disclosed herein in a form in which various system functions are performed by discrete computers. However, any one or more of these functions could equally well be embodied in an arrangement in which the functions of any one or more of those discrete computers or indeed, all of the functions thereof, are realized, for example, by one or more appropriately programmed processors.

Figure 2:
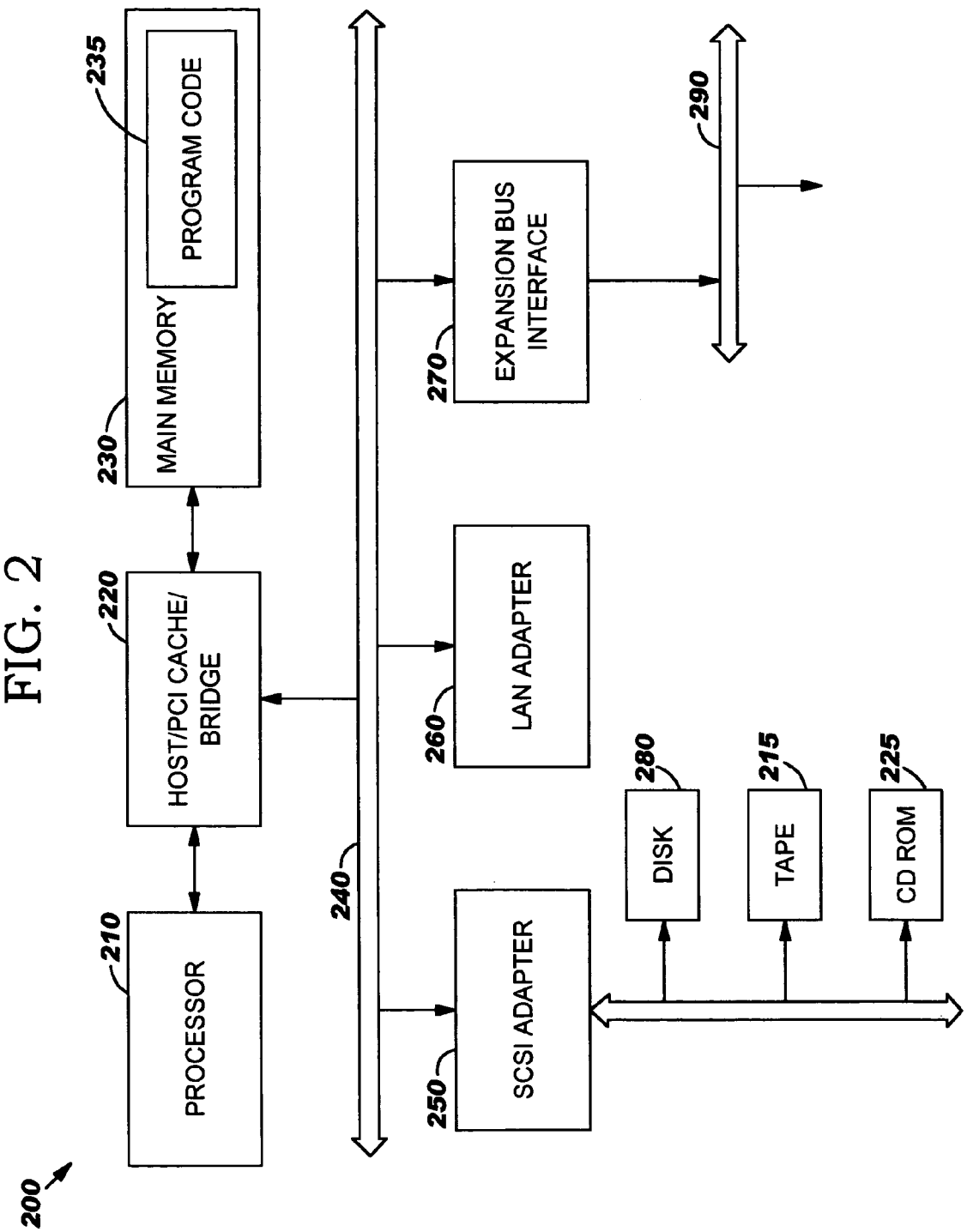
FIG. 2 shows a block diagram of an exemplary computer system in which the present invention may be suitably implemented.

FIG. 2 shows a block diagram illustrating a computer in which the present invention may be suitably implemented. A computer 200 may suitably be a handheld computer, a notebook, a server or any other processor based machine used to perform the responsibilities of a requestor 110, intermediary 120A or 120B, service provider 140, or the broker 130 described above. The computer 200 as illustrated employs a peripheral component interconnect (PCI) local bus architecture. Although a PCI bus 240 is shown, other bus architectures such as Accelerated Graphics Port (AGP) and Industry Standard Architecture (ISA) may be used. A processor 210 and main memory 230 are connected to the PCI local bus 240 through a PCI bridge 220. PCI bridge 220 also may include an integrated memory controller and cache memory for processor 210. In the depicted example, a small computer system interface (SCSI) host bus adapter 250, a local area network (LAN) adapter 260, and an expansion bus interface 270 are connected to the PCI local bus 240 by direct component connection. Expansion bus interface 270 provides a connection to an expansion bus 290 for additional peripherals not shown. The SCSI host bus adapter 250 provides a connection for hard disk drive 280, a tape drive 215, and a CD-ROM drive 225.

An operating system runs on processor 210 and is used to coordinate and provide control of various components within the computer 200. The operating system may be a commercially available operating system, such as AIX®, LINUX®, Windows®, Windows® CE 3.0, or the like. An object oriented virtual machine such as one which executes applications written in Java™, Object Oriented Perl, Visual Basic, or other suitable object oriented language may run in conjunction with the operating system and provide calls to the operating system from Java™ programs or applications executed by the processor 210 in the computer 200. Instructions for the operating system, the object oriented virtual machine, and applications or programs such as the present invention are located on storage devices, such as disk 280 or a network server, and may be loaded into main memory 230 for execution by processor 210. The processor 210 may typically run at 200 Mhz or greater.

Program code 235 contains instructions which when executed cause the computer to perform functions in accordance with the present invention. When the program code 235 corresponds to the intermediary subsystem such as intermediary subsystem 120A-120B shown in FIG. 1, the executed instructions perform functions such as registering a translation to the broker, performing the translation, and forwarding the translation result to the service provider. Translations offered by an intermediary affect constraints surrounding the data which passes between the requestor and the service provider. More specifically, these constraints are described as metadata. The term metadata as used herein describes how, when or by whom a particular set of data was collected, and how the data is formatted.

When the program code 235 corresponds to the broker subsystem such as broker subsystem 130 shown in FIG. 1, the executed instructions perform functions such as accepting registration from an intermediary, receiving requests for an intermediary from a requester to translate, and performing a match between registered intermediaries which match the policy requirements. When the program code 235 corresponds to a requestor such as requestor 110 shown in FIG. 1, the executed instructions perform functions such as asking the broker for an intermediary to help it adhere to a service provider's policy and accessing the returned intermediary. When computer 200 runs as a service provider, web server software may run in conjunction with the operating system to provide a platform upon which the service provider runs.

Those of ordinary skill in the art will appreciate that the hardware in FIG. 2 may vary depending on the implementation. Other internal hardware or peripheral devices, such as flash ROM or equivalent nonvolatile memory, and the like, may be used in addition to or in place of the hardware depicted in FIG. 2. Also, the processes of the present invention may be applied to a multiprocessor data processing system. The example shown in FIG. 2 and the examples described below are not meant to imply architectural limitations of the present invention.

Figure 3:
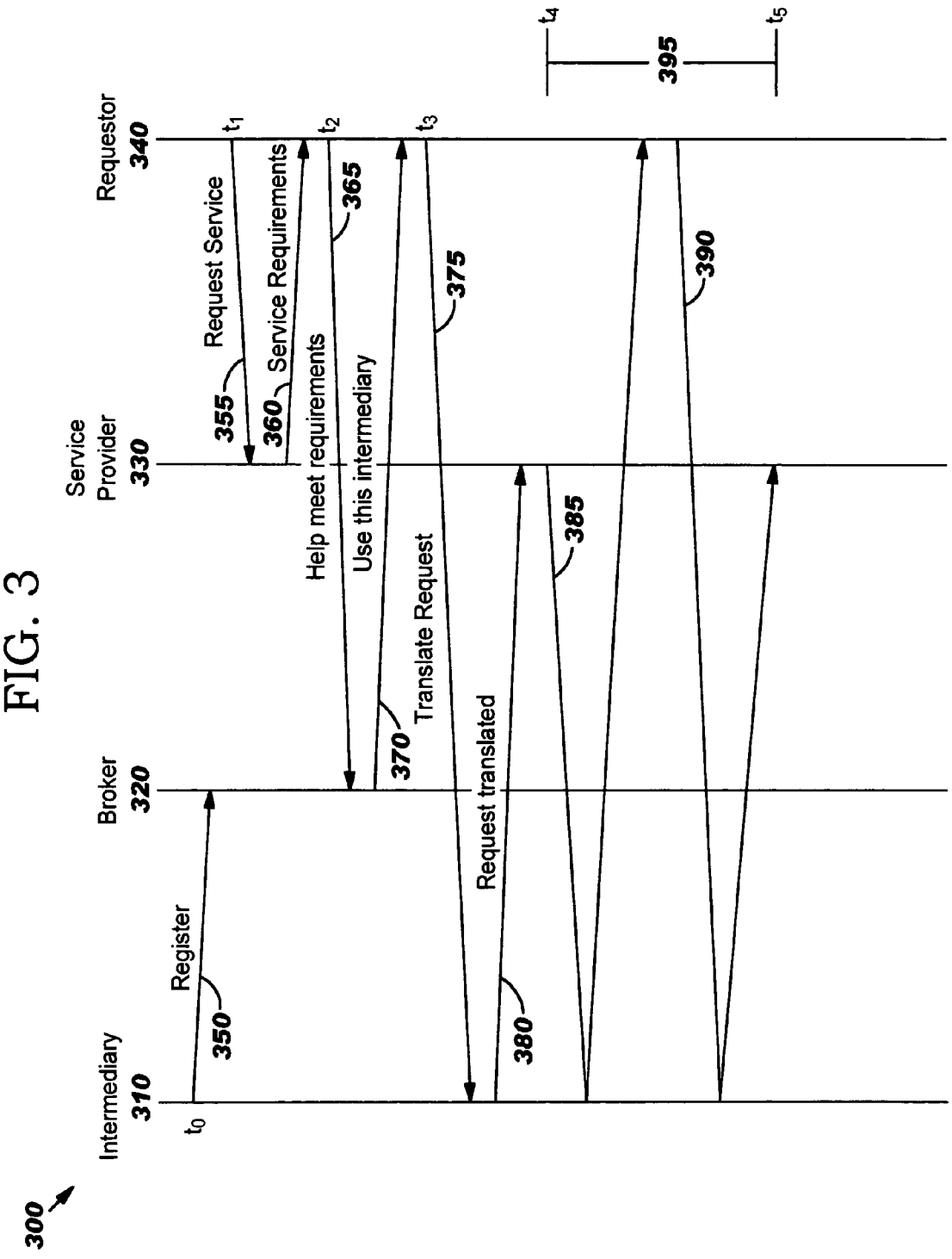
FIG. 3 shows exemplary message flows between the subsystems of FIG. 1 in accordance with the present invention.

FIG. 3 shows exemplary message flows 300 between the subsystems of FIG. 1 in accordance with the present invention. Timelines 310, 320, 330, and 340 are illustrated for the intermediary 120A, broker 130, service provider 140, and requestor 110 subsystems, respectively. For the purposes of FIGS. 3 and 4, the originator of an arrow represents the originator of the message and the terminator of the arrow represents the destination of the message. Messages will preferably be transferred using SOAP. However, it is noted that any suitable remote procedural call (RPC) mechanism can be used. At time $t_0$, intermediary 120A sends a register message to the broker 130 which registers the type of translation that intermediary 120A can perform. In this example, intermediary 120A can perform PKI-to-Kerberos translation for $0.90 per service transaction and intermediary 120B can perform PKI-to-X509 translation for $0.80 per service transaction. The broker 130 maintains records for all registered intermediaries and their corresponding translations.

Along the lines of the example provided above, another example of translations offered by an intermediary includes providing buffering capacity between a requestor and a service, thereby eliminating the need for the requestor to provide the buffering capability. These records may be stored in random access memory, disk, or other suitable storage device as simple records or records within a database.

Returning to FIG. 3, at some later time $t_1$, the requestor 110 requests service from service provider 140. The requestor may gain access to service provider 140 through a directory engine. In any case, the requestor sends a request service message 355 to service provider 330. Service provider 330 responds 360 with its service requirements. Typically, these service requirements will be expressed in metadata using WS-Policy constructs. For example, the service requirements may include a security policy and that policy may be expressed as shown in the following code segment:

```
001     <wsp:Policy xmlns:wsse="..." xmlns:wsp="...">
002       <wsp:ExactlyOne>
003         <wsse:SecurityToken wsp:Usage="wsp:Required" wsp:Preference="100">
004           <wsse:TokenType>wsse:Kerberosv5TGT</wsse:TokenType>
005         </wsse:SecurityToken>
006         <wsse:SecurityToken wsp:Usage="wsp:Required" wsp:Preference="1">
007           <wsse:TokenType>wsse:X509v3</wsse:TokenType>
008         </wsse:SecurityToken>
009       </wsp:ExactlyOne>
010     </wsp:Policy>
```

Lines 1 to 10 represent a set of policy assertions for authentication. Lines 2 to 9 represent the <wsp: ExactlyOne> policy operator that is used to group policy assertions into policy sets. For example, a valid policy can contain any one of the contained assertions as shown in lines 3-8. Lines 3 to 5 and 6 to 8 represent two specific security policy assertions that indicate that two types of authentication are supported and that of the two types, Kerberos authentication is preferred over X509 authentication.

Returning to FIG. 3, the requestor 110 receives the service requirements. In this example, the requestor 110 only supports authentication through PKI. Once the requestor 110 recognizes this discrepancy between what it supports and what the service provider requires, the requestor 110 sends a message 365 to the broker 130 which asks the broker to find an intermediary which can translate PKI authentication to either X509 authentication or Kerberos authentication. Intermediaries may charge requesters a fee for providing the translation function to the requestor to enable it to retrieve service from the service provider. Intermediaries may distinguish themselves not only by which type of translation is offered, but also can distinguish themselves on performance objectives, so that as appropriate, a requester may choose a more expensive intermediary which will perform a translation faster than a less expensive intermediary. Optionally, the requestor 110 may include in the same or subsequent message a list of additional constraints which a suitable intermediary must satisfy. In this example, requestor 110 is willing to pay $1 per service transaction for Kerberos translation and to pay $0.75 per service transaction for X509 translation. Upon receipt of message 365, the broker 130 searches its list of registered intermediaries to find a suitable intermediary which can translate PKI authentication to either X509 or Kerberos authentication within the monetary budget specified by requestor 110. Since intermediary 120A can translate PKI to Kerberos authentication for under $1 per service transaction, broker 130 would send message 370 to inform requestor 110 to use intermediary 120A to perform the translation. Message 370 would contain an address of intermediary 120A to inform requester 110 how it may contact intermediary 120A.

At time $t_3$ when requestor 110 wants to begin receiving the service provided by service provider 140, requestor 110 sends a translate request message 375 to intermediary 120A to translate PKI authentication to Kerberos. Upon receipt of message 375, intermediary 120A translates requestor's PKI authentication to Kerberos authentication and forwards the translated request message 380 to service provider 140. Since the translation function relates to authentication, communication between the service provider 140 and the requestor 110 will be maintained through the intermediary 120A. The communication path between the intermediary 120A and the service provider 140 would be maintained as a Kerberos authentication session while the communication path between the intermediary and the requestor would be maintained as a PKI session. These maintained paths of communication through the intermediary are illustrated by messages 385 and 390 which are sent during time interval 395. It is noted that the type of translation function provided by an intermediary determines whether a path through the intermediary is maintained and whether that path through the intermediary is bi-directional. Typically, in the cases where a path through the intermediary is maintained in only one direction that one direction is an upstream direction from the requestor to the service provider.

Figure 4:
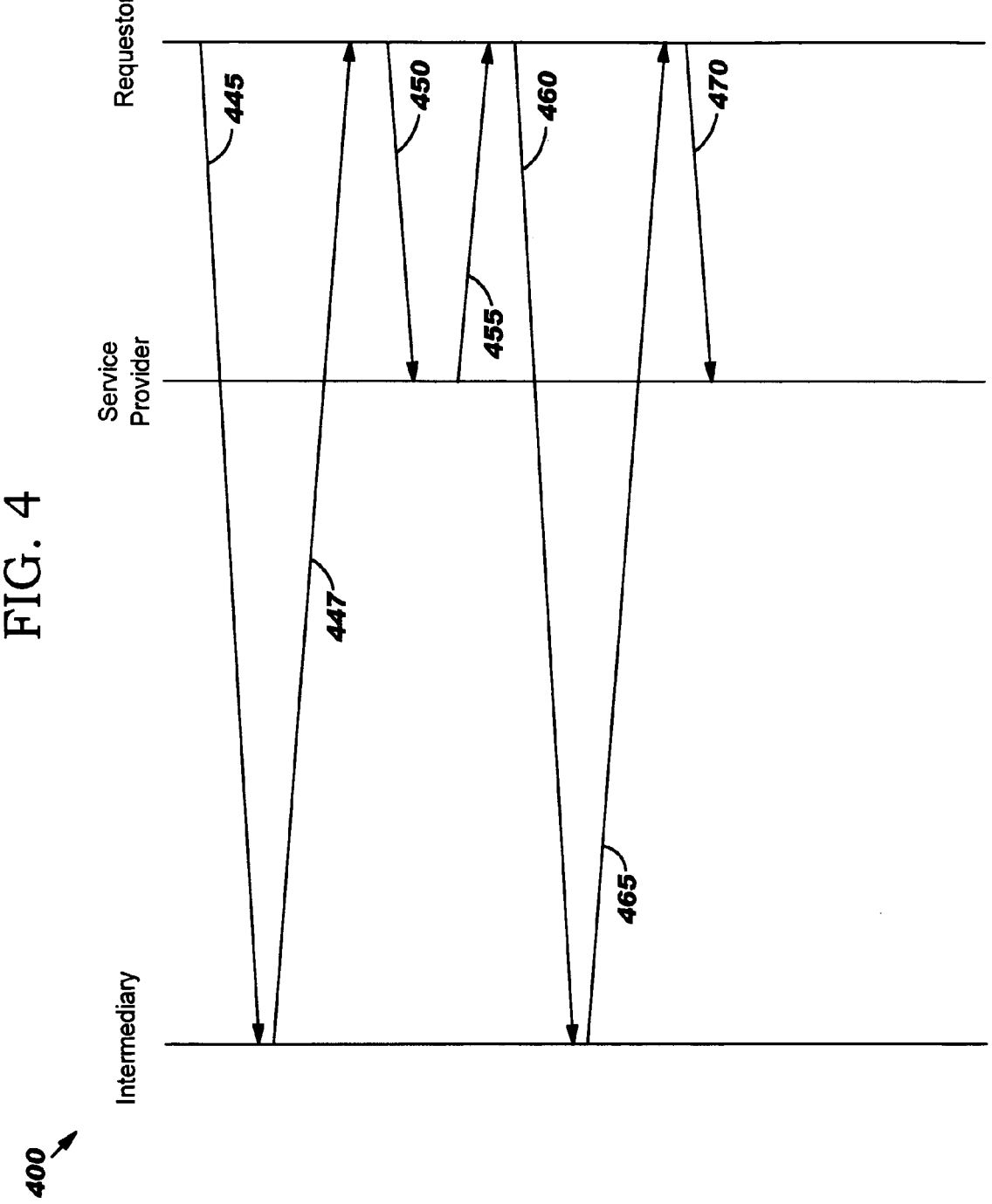
FIG. 4 shows alternative message flows for communication during a subsequent time interval in accordance with the present invention.

FIG. 4 shows alternative message flows 400 when the communication path through the intermediary is maintained in the upstream direction. Before message 445 is sent, it is presumed that the messages of FIG. 3 ending with message 380 have occurred. The message flow in FIG. 4 takes place during time interval 395. A requestor may request translation on a per request basis and forward the translated request to the service provider. After a requestor has been notified of an intermediary for performing a translation function, message 445 is sent to the intermediary to translate the request intended for the service provider. The intermediary responds with a translated response message 447 to the requestor. Contained in the translated response message 447 are the results of the translation performed by the intermediary. Unlike FIG. 3, the requestor is responsible for utilizing the results of the translation and forwarding a subsequent request 450 which contains those results. Message 455 represents a message provided by the service provider to the requestor having content in a translated format. In this scenario, when the requestor communicates with the service provider, the requester sends a message 460 for the intermediary to perform the translation. The intermediary responds with message 465 containing the performed translation. Then, the requestor communicates with message 470 directly with the service provider. In this upstream scenario, the service provider only communicates with the requestor but the requestor communicates with the intermediary before communicating with the service provider. It will be recognized that downstream paths through the intermediary are also contemplated.

In another example of the present invention, a service provider may require payment for providing its service to a requestor. In this embodiment, the requestor would specify its monetary budget and optionally its performance budget for the translation to the broker. The requestor's monetary budget may depend on the service provider's prices advertised in the service requirements. If there exist comparable services being offered by different service providers, a requester may use an intermediary/service provider combination to retrieve the overall service for the least cost. It will be noted that the prices used in this example do not reflect actual costs for a service but are specified to demonstrate a point. For example, two service providers owned by ABC Corporation and XYZ Corporation, respectfully, which provide weather services are available to a requestor. ABC Corporation's service provider charges $4.95 per transaction and has the service requirement of Kerberos authentication. XYZ Corporation's service provider charges $5.00 per transaction and has the service requirement of X509 authentication. As stated in the above example, a requestor requesting service may only support PKI authentication. Also, two intermediaries exist where one intermediary performs PKI-Kerberos translation for $0.90 per transaction and the other intermediary performs PKI-X509 translation for $0.80 per transaction. This embodiment of the present invention would result in the broker providing the PKI-X509 intermediary and the requestor selecting XYZ Corporation's service provider to retrieve weather service for a total of $5.80 per transaction as compared with the higher price combination of the PKI-Kerberos intermediary and ABC Corporations's service provider. If the a cost for the requestor to develop X509 or Kerberos is greater than the cost of using the intermediary, the present invention allows a requestor to receive a higher priced service through an intermediary at a price less than developing the translation itself and communicating directly with the service requestor without an intermediary.

Figure 5:
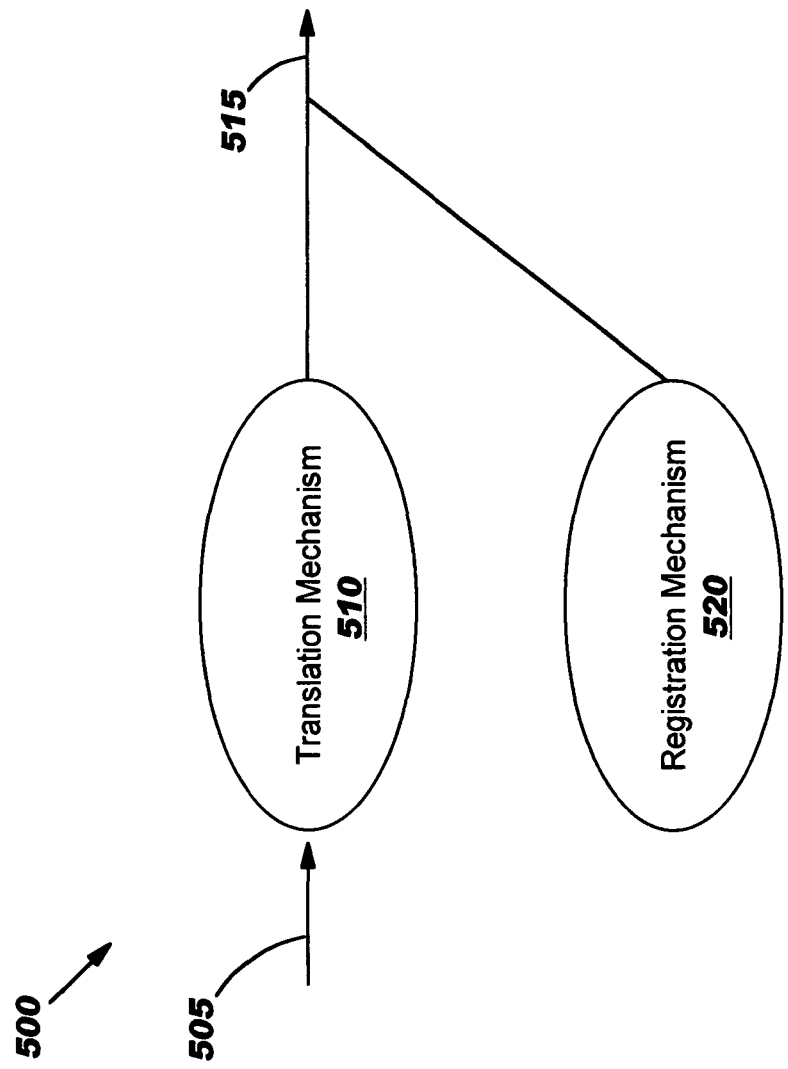
FIG. 5 shows a block diagram of an intermediary subsystem in accordance with the present invention.

FIG. 5 shows a block diagram of an intermediary subsystem 500 in accordance with the present invention. The intermediary subsystem 500 includes a translation mechanism 510 having an input 505 for receiving a message containing a property from a requestor such as message 375. The translation mechanism 510 translates the property and sends a message such as message 380 having a translated property through output 515. The intermediary subsystem 500 also includes a registration mechanism 520 which sends registration messages such as 350 to a broker to register the intermediary subsystem. In a preferred embodiment, the registration mechanism 520 uses WS-Policy constructs to accomplish the registering process. The input 505 and output 515 are typically software interfaces including message interfaces, application program interfaces, and the like.

FIG. 6 shows a method 600 of using an intermediary for translating operations between a service requestor and service provider in accordance with the present invention. Beginning with step 610, one or more intermediaries are registered with a broker as described above in connection with the discussion of FIG. 3. At step 620, a requestor requests a service from a service provider. At step 630, the requestor receives a reply message containing either a service requirement or a set of service requirements. At step 640, the requester determines whether it has the capability to satisfy the service requirements. If the requestor does have the proper capability, the method proceeds to step 650. At step 650, the requestor receives the service from the service provider by communicating with the service provider according to the received set of service requirements.

Returning to step 640, if the requestor does not have the proper capability, the methods proceeds to step 660 where the requestor asks the broker to help satisfy the set of service requirements. At step 670, the broker determines one or more registered intermediaries which can satisfy the set of service requirements and optionally the requestor's own constraints. At step 680, the broker provides one or more intermediaries which provide the proper capability, such as a translation function to satisfy the set of service requirements. At step 690, the requestor utilizes the capability of the provided intermediary when retrieving service from the service provider.

We claim:

1. A method for using an intermediary to enable a service requester to use a service offered by a service provider, the method being performed by the intermediary on an intermediary computer in communication with both the service requester and the service provider and comprising:

receiving, from the service requester, one or more translation request messages, the messages identifying the service to be requested from the service provider, defining a service requirement established for the service by the service provider, and defining a related service capability of the service requester for the service, wherein the service requirement indicates that the service provider requires authentication using a first authentication mechanism and the related service capability indicates that the service requester is capable of performing authentication using a second authentication mechanism that differs from the first authentication mechanism; and responsive to determining that the related service capability does not satisfy the service requirement, performing:

generating a service translation that provides a translation between the service requirement and the related service capability and that enables the service requester to request the service directly from the service provider and to process results received directly from the service provider; and forwarding the generated service translation to the service requester.

2. The method according to claim 1, further comprising registering a capability to perform the service translation with a services broker to thereby enable the service requester to locate the intermediary that will receive the one or more translation request messages.

3. A computer program product comprising a non-transitory computer usable medium having computer usable program code recorded therein, the computer usable program code, when loaded onto and executed by an intermediary on an intermediary computer system enables the intermediary computer system to perform a method comprising:

receiving, from the service requester, one or more translation request messages, the messages identifying the service to be requested from the service provider, defining a service requirement established for the service by the service provider, and defining a related service capability of the service requester for the service, wherein the service requirement indicates that the service provider requires authentication using a first authentication mechanism and the related service capability indicates that the service requester is capable of performing authentication using a second authentication mechanism that differs from the first authentication mechanism; and responsive to determining that the related service capability does not satisfy the service requirement, performing:

generating a service translation that provides a translation between the service requirement and the related service capability and that enables the service requester to request the service directly from the service provider and to process results received directly from the service provider; and forwarding the generated service translation to the service requester.

4. The computer program product according to claim 3, further comprising computer usable program code for registering a capability to perform the service translation with a services broker to thereby enable the service requester to locate the intermediary that will receive the one or more translation request messages.

5. A computer-implemented intermediary system to enable a service requester to use a service offered by a service provider, the computer-implemented intermediary system comprising:

a computer comprising a processor; and instructions which are executable, using the processor, to implement functions comprising:

receiving, from the service requester, one or more translation request messages, the messages identifying the service to be requested from the service provider, defining a service requirement established for the service by the service provider, and defining a related service capability of the service requester for the service, wherein the service requirement indicates that the service provider requires authentication using a first authentication mechanism and the related service capability indicates that the service requester is capable of performing authentication using a second authentication mechanism that differs from the first authentication mechanism; and responsive to determining that the related service capability does not satisfy the service requirement, performing:

generating a service translation that provides a translation between the service requirement and the related service capability and that enables the service requester to request the service directly from the service provider and to process results received directly from the service provider; and forwarding the generated service translation to the service requester.

6. The computer-implemented intermediary system according to claim 5, wherein the functions further comprise registering a capability to perform the service translation with a services broker to thereby enable the service requester to locate the intermediary that will receive the one or more translation request messages.

* * * * *